United States Patent [19]

Kitamoto et al.

[11] 4,439,796
[45] Mar. 27, 1984

[54] MAGNETIC RECORDING MEDIUM

[75] Inventors: Tatsuji Kitamoto; Goro Akashi, both of Odawara, Japan

[73] Assignee: Fuji Photo Film Co., Ltd., Kanagawa, Japan

[21] Appl. No.: 329,099

[22] Filed: Dec. 9, 1981

[30] Foreign Application Priority Data

Dec. 11, 1980 [JP] Japan ............................ 55-174981

[51] Int. Cl.³ .................. G11B 5/74; H01F 1/02; B05D 5/12; B32B 7/02
[52] U.S. Cl. ............................ 360/131; 148/105; 360/134; 427/131; 428/551
[58] Field of Search ............... 360/131, 134, 135, 56, 360/57; 148/31, 57, 105; 428/611, 928; 75/0.5 AA; 427/127, 131

[56] References Cited

U.S. PATENT DOCUMENTS

| | | | |
|---|---|---|---|
| 3,761,311 | 9/1973 | Perrington | 360/134 |
| 3,855,016 | 12/1974 | Enrreich | 360/131 |
| 4,072,501 | 2/1978 | Quinby | 75/0.5 AA |
| 4,075,384 | 2/1978 | Suzuki | 360/131 |
| 4,237,506 | 12/1980 | Manly | 148/105 |
| 4,246,316 | 1/1981 | Aonuma | 428/551 |
| 4,259,392 | 3/1981 | Suzuki | 427/131 |
| 4,307,156 | 12/1981 | Yanagisawa | 427/131 |

Primary Examiner—Robert M. Kilgore
Attorney, Agent, or Firm—Sughrue, Mion, Zinn, Macpeak and Seas

[57] ABSTRACT

A magnetic recording medium is described having formed on a non-magnetic base at least two magnetic layers, each of the magnetic layers comprising ferromagnetic particles dispersed in a binder, wherein the ferromagnetic particles in the outermost magnetic layer are substantially cubic particles and have a side length of $0.3\mu$ or less, and the ferromagnetic particles in an underlying magnetic layer are acicular particles.

5 Claims, No Drawings

MAGNETIC RECORDING MEDIUM

FIELD OF THE INVENTION

This invention relates to a magnetic recording medium, and more particularly, to a magnetic recording medium having high S/N (signal to noise) ratio in high-density recording, and which is free from low reproduction output in low-density recording.

BACKGROUND OF THE INVENTION

Many studies have been made to increase the recording density of magnetic recording media (i.e., [the relative speed of tape and/head]/[maximum frequency of recording signals]) so as to make high-fidelity audio cassettes and low-speed small video tapes. The proposals made to date include increasing the coercive force of the magnetic layer, increasing both the residual magnetization and coercive force (as in a metal tape), and increasing the coercive force of an upper magnetic layer.

Vertical magnetic recording has also been proposed wherein a residual magnetizable component in a direction normal to the plane of the magnetic recording medium is effectively utilized. According to this method, the recording density as defined above is increased, and when the recording wavelength is made smaller than the thickness of the recording layer, there is be no further reduction in output due to self-demagnetization. (The "self-demagnetization" means the decrease in residual magnetization due a self-demagnetizing field that is established between the N-S poles, created by its own residual magnetization, and that exists in a direction opposite to that of its magnetization so as to offset the latter, and the magnitude of self-demagnetization is increased with decreasing distance between the N-S poles.) Thus, this method is said to be effective in high-density recording in a region where the recording wavelength is less than 1 or 2 microns.

Another proposal is to utilize a magnetic layer of a coated type containing a magnetizable component extending obliquely or normaly to the magnetic surface. See U.S. Pat. Nos. 3,052,567 and 3,185,775, and Japanese Patent Publication No. 15203/74.

SUMMARY OF THE INVENTION

One object of this invention is to provide a magnetic recording medium having high S/N ratio in high-density recording, and which is free from reduced reproduction output in low-density recording.

As a result of extensive studies to attain this object, we have found that both the residual magnetic susceptibility in a vertical direction and the recording density can be increased by using substantially cubic ferromagnetic particles (i.e., a length to width ratio of 1/1) having a side length of $0.3\mu$ or less. We have also found that a magnetic layer made of these ferromagnetic particles achieves high recording sensitivity at short wavelengths using a small-gap head, but achieves a very low sensitivity at long wavelengths (i.e., in low frequency range), and that this defect can be eliminated by using a magnetic layer of two or more sublayers containing acicular ferromagnetic particles, preferably having a length to width ratio of 3/1 or more, more preferably 5/1 or more, in a layer other than an outermost layer of the cubic ferromagnetic particles oriented in a direction parallel to the magnetic surface.

Therefore, this invention provides a magnetic recording medium having formed on a non-magnetic base at least two magnetic layers, each comprising ferromagnetic particles dispersed in a binder, wherein the ferromagnetic particles in the outermost magnetic layer (i.e., farthest from the base) are substantially cubic particles having a side length of $0.3\mu$ or less, and the ferromagnetic particles in an underlying magnetic layer are acicular particles.

DETAILED DESCRIPTION OF THE INVENTION

The magnetic recording medium of this invention has a number of advantages over the prior art products described above. By using substantially cubic ferromagnetic particles of not more than $0.3\mu$ in side length in the outermost magnetic layer, the noise level due to discontinuous magnetization caused by the presence of large particles is reduced, and by reducing the length to width ratio of the particles, the tendency of the particles to be oriented as they lie on the plane of the magnetic layer (for example, the disposition to be oriented parallel to the magnetic surface due to a reduced magnetic layer thickness that occurs during application or drying of a coating solution, or the disposition to be oriented in the direction in which the coating solution is cast) can be minimized. Also, if desired, the particles can be given a disposition to be oriented normal to the magnetic surface so as to provide great residual magnetization normal to the magnetic surface. As another advantage, the underlying magnetic layer is made of ferromagnetic particles having large length to width ratio so as to achieve high sensitivity at long wavelengths.

When the magnetic recording medium of this invention has three or more magnetic layers, the above requirements may be met by the outermost layer and at least one of the underlying layers.

The cubic particles used in the outermost layer of the magnetic recording medium of this invention can be prepared by the following methods.

(1) A solution of ferrous or ferric ions is boiled in strong alkali to precipitate magnetite particles. In this case, part of the ferrous ions may be replaced by Co ions to increase the coercive force to a desired level. The precipitated magnetite particles are washed with water, dried, and heated at about 200° C. in an inert atmosphere or air.

(2) Ferrous ions are mixed with more than the neutralization equivalent of an alkali, and by boiling the mixture under the blowing of air or in the presence of an oxidizing agent such as a nitrate salt, magnetite particles are obtained as in (1). Part of the ferrous ions may be replaced by Co ions, and the precipitated magnetite particles may be subsequently heated as in (1).

(3) The iron oxide particles prepared in (1) or (2) are reduced with hydrogen to provide metallic iron particles.

(4) The particles of iron, cobalt, nickel or their alloys are condensed by evaporation in a low degree of vacuum, or a solution of an iron, cobalt, or nickel salt is reduced with sodium borohydride or hypophosphorous acid to provide alloy particles. The resulting alloy particles may be heated in an inert gas to improve their properties.

(5) Barium ferrite is ground to fine particles and classified to a size of about $0.3\mu$ or less by levigation or other suitable means. Alternatively, a co-precipitate of Ba and Fe ions is given a hydrothermal treatment to provide fine single crystals of ferrite. In this case, Ba ions may be partially replaced with other metal ions to increase the coercive force.

The outermost magnetic layer containing these cubic particles can be formed by the same method as is used to form an underlying layer, which will be described below. The outermost layer generally has a thickness of $3\mu$ or less, and more preferably from about 0.5 to $2\mu$. There will be no great difference whether the ferromagnetic particles of (1) to (4) that have three-dimensional crystalline magnetic anisotropy are oriented or not, but the particles of (5) that are hexagonal and which have crystalline magnetic anisotropy along the C-axis are desirably oriented in a direction normal to the magnetic surface.

The acicular ferromagnetic particles used in a layer other than the outermost layer of this invention can include any known fine ferromagnetic particles such as $\gamma$-$Fe_2O_3$, Co-containing $\gamma$-$Fe_2O_3$, $Fe_3O_4$, Co-containing $Fe_3O_4$, $CrO_2$, Co-Ni-P alloy and Co-Ni-Fe alloy, examples of which are described in Japanese Patent Publication Nos. 14090/69, 18372/70, 22062/72, 22513/72, 28466/71, 38755/71, 4286/72, 12422/72, 17284/72, 18509/72, 18573/72, and U.S. Pat. No. 3,865,627.

The non-magnetic binder used in this invention may be a thermoplastic resin or a thermosetting (reactive) resin. Suitable thermoplastic resins have a softening point of less than 150° C., an average molecular weight of about 10,000 to 20,000, and a degree of polymerization of about 100 to 1000. Examples of such polymers are vinyl chloride/vinyl acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, polyvinyl fluoride, vinylidene chloride/acrylonitrile copolymer, butadiene/acrylonitrile copolymer, polyamide resin, polyvinyl butyral, cellulose derivative (e.g. cellulose acetate butyrate, cellulose diacetate, cellulose triacetate, cellulose propionate, or nitrocellulose), styrene/butadiene copolymer, polyester resin, chlorovinyl ether/acrylic acid ester copolymer, amino resins, various synthetic rubber thermoplastic resins and mixtures thereof.

Specific examples of such resins are described in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

The thermosetting (reactive)resin is such that it has a molecular weight of less than 200,000 when it is in coating solution and that after application and drying of a coating solution, its molecular weight is increased infinitely due to condensation, addition or other reactions. Preferred thermosetting resins are those which do not soften or melt until they are decomposed with heat. Specific examples are phenolic resins, epoxy resins, polyurethane curable resin, urea resin, melamine resin, alkyd resin, silicone resin, acrylic reactive resin, epoxy-polyamide resin, nitrocellulose melamine resin, a mixture of high-molecular weight polyester resin and isocyanate prepolymer, a mixture of methacrylic acid salt copolymer and diisocyanate prepolymer, a mixture of polyester polyol and polyisocyanate, urea-formaldehyde resin, low-molecular weight glycol/high-molecular weight diol/triphenylmethane triisocyanate mixture, polyamine resins and mixtures thereof.

Specific examples of these resins are found in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72.

These binders are used alone or in admixture, and they may also be combined with additives. The weight ratio of the ferromagnetic particles to the binder is in the range of from 10 to 200 parts by weight of the binder to 100 parts by weight of the ferromagnetic particles. Examples of additives include dispersants, lubricants, and abrasives.

Examples of dispersants include aliphatic acids having from 12 to 18 carbon atoms ($R_1COOH$ wherein $R_1$ is an alkyl group having from 11 to 17 carbon atoms) such as caprylic acid, capric acid, lauric acid, myristic acid, palmitic acid, stearic acid, oleic acid, elaidic acid, linoleic acid, linolenic acid, and stearolic acid. Metal soaps made of alkali metals (Li, Na, K, etc.) or alkaline earth metals (Mg, Ca, Ba, etc.) of these aliphatic acids, as well as lecithins, may also be used as the dispersant. Higher alcohols having 12 or more carbon atoms, as well as sulfate esters of these alcohols are also usable. These dispersants are typically used in an amount of from 1 to 20 parts by weight per 100 parts by weight of the binder. Illustrative dispersants are described in Japanese Patent Publication Nos. 28369/64, 17945/69, and 15001/73, and U.S. Pat. Nos. 3,387,993 and 3,470,021.

Examples of lubricants include silicone oil, graphite, molybdenum disulfide, tungsten disulfide, aliphatic acid esters formed from monobasic aliphatic acids having from 12 to 16 carbon atoms and monovalent alcohols having from 3 to 12 carbon atoms, and aliphatic acid esters of monobasic aliphatic acids having 17 or more carbon atoms and monovalent alcohols having a numer of carbon atoms such that the number added to the number of carbon atoms in the aliphatic acids totals from 21 to 23. These lubricants are typically used in an amount of 0.2 to 20 parts by weight for 100 parts by weight of the binder. For more details of these lubricants, see Japanese Patent Publication No. 23889/68, Japanese Patent Application Nos. 28647/67, 81543/68, U.S. Patent No. 3,423,233 and Japanese Patent Publication No. 28043/72.

Examples of the abrasive are $Cr_2O_3$, $Al_2O_3$, and the compounds described in Canadian Patent No. 813,289.

The magnetic recording layer can be formed on a base from a magnetic paint comprising the ferromagnetic particles, binder and other additives by air doctor coating, blade coating, air knife coating, squeeze coating, impregnation coating, reverse roll coating, transfer roll coating, gravure coating, kiss coating, cast coating, and spray coating. Details of these and other useful coating techniques are described in "Coating Kogaku (Coating Engineering)", published by Asakura Shoten, Mar. 20, 1971, pp. 253–277.

This invention is now described in greater detail by reference to the following example, which is given here for illustrative purposes only, and is not intended to limit the scope of the invention. In the example, all parts are by weight.

EXAMPLE 1

Magnetic materials A, B, and C, having the following compositions were prepared.

Magnetic material A: The cubic particles of $\gamma$-$Fe_2O_3$ one side which was $0.2\mu$ long and which contained 8% Co were prepared by the method of (2) described herein. They had a coercive force of 900 Oe.

Magnetic material B: Iron particles were produced by reducing a solution of iron salt with sodium borohydride, and the resulting iron particles were heated at 200° C. in a nitrogen atmosphere. The cubic particles obtained were 0.08 long on one side and had a coercive force of 1050 Oe.

Magnetic material C: This acicular material was Co-modified $\gamma$-$Fe_2O_3$ particles $0.4\mu$ long having a length to width ratio of 12/1. It had a coercive force of 700 Oe.

Magnetic material C (or A or B when coating those materials) was mixed with the following components in a ball mill in the amounts indicated below.

| Magnetic material C | 100 parts |
| --- | --- |
| Vinyl chloride-vinyl acetate copolymer | 15 parts |
| Epoxy resin | 7 parts |
| Polyamide resin | 5 parts |
| Carbon black | 7 parts |
| Silicone oil | 1 part |
| Amyl stearate | 0.2 part |
| Methyl ethyl ketone | 180 parts |

The resulting dispersion was applied to a polyester base ($22\mu$ thick) until its dry thickness was $4\mu$. The particles in the resulting magnetic coating were oriented longitudinally, dried and calendered to provide a smooth surface. Subsequently, three samples of such magnetic underlying layers were coated with dispersions containing magnetic materials A, B, and C in the formulation indicated above in the same manner to form an outermost layer in a dry thickness of $1\mu$. The particles in each outermost layer were not oriented in a magnetic field. Two other samples were prepared by coating a polyester base ($22\mu$ thick) only with a layer of magnetic materials A and B, respectively, to form layers having a dry thickness of $5\mu$. The respective samples were calendered and slit to ½ inch wide, and the resulting samples were referred to as Sample Nos. 1, 2, 3, 4 and 5.

The sensitivity of the respective samples was measured. For the sensitivity for recording at short wavelengths, the output and noise level at a recording wavelength of $1\mu$ were measured with a helical VTR. The ratio of the output in reproduction after recording a 3 MHz sine-wave signal (output at short wavelength) to the noise level at 2 MHz (C/N ratio at short wavelength) was measured with a ferrite head (head gap: $0.2\mu$) at a relative speed of head and tape of 2.9 m/sec. For recording at long wavelengths, the sensitivity at a recording wavelength of $100\mu$ (output at long wavelength) was measured with a ferrite head (head gap: $1.2\mu$). The results of the measurement are shown in Table 1, wherein the values are indicated by dB as a deviation from the reference values of Sample No. 3. As is clear from Table 1, Sample Nos. 1 and 2 according to this invention produce a great output both at short and long wavelength and achieve high S/N ratio at short wavelength as compared with Control Sample Nos. 3 to 5.

TABLE 1

| | | Outermost layer | | |
| --- | --- | --- | --- | --- |
| Sample No. | Undercoat layer | Output at short wavelength ($\Delta$dB) | C/N ratio at short wavelength ($\Delta$dB) | Output at long wavelength ($\Delta$dB) |
| 1 | A/C | +6 | +5.5 | 0 |
| 2 | B/C | +6 | +5 | +1 |
| 3 | C/C | 0 | 0 | 0 |
| 4 | A/A | +5 | +6 | −6 |
| 5 | B/B | +7 | +6 | −3 |

In Example, 1, $\gamma$-$Fe_2O_3$ particles were used in the underlying layer. It is noted that the $\gamma$-$Fe_2O_3$ may be replaced by co-modified iron oxide, chromium dioxide, iron, cobalt, nickel or alloys thereof.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having formed on a non-magnetic base at least two magnetic layers, each comprising ferromagnetic particles dispersed in a binder, wherein the ferromagnetic particles in the outermost magnetic layer are substantially cubic particles having a side length of $0.3\mu$ or less, and the ferromagnetic particles in an underlying magnetic layer are acicular particles.

2. A magnetic recording medium as in claim 1, wherein the acicular particles have a length to width ratio of 3/1 or more and are oriented in a direction parallel to the magnetic surface.

3. A magnetic recording medium as in claim 1 or 2, wherein the outermost magnetic layer has a thickness $3\mu$ or less.

4. A magnetic recording medium as in claim 3, wherein the outermost magnetic layer has a thickness from about 0.5 to $2\mu$.

5. A magnetic recording medium as in claim 1 or 2, wherein the substantially cubic particles consist essentially of barium ferrite particles that are hexagonal and have crystalline magnetic anisotropy along the C-axis and are oriented in a direction normal to the magnetic surface.

* * * * *